US012107942B2

(12) United States Patent
Magatayama

(10) Patent No.: US 12,107,942 B2
(45) Date of Patent: Oct. 1, 2024

(54) COMMUNICATION DEVICE FOR CONTINUOUS COMMUNICATION WITH ANOTHER COMMUNICATION DEVICE DURING SWITCH OF COMMUNICATION PROTOCOL

(71) Applicant: DENSO CORPORATION, Kariya (JP)

(72) Inventor: Takaya Magatayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 199 days.

(21) Appl. No.: 17/587,428

(22) Filed: Jan. 28, 2022

(65) Prior Publication Data
US 2022/0159105 A1 May 19, 2022

Related U.S. Application Data

(63) Continuation of application No. PCT/JP2020/026978, filed on Jul. 10, 2020.

(30) Foreign Application Priority Data

Jul. 31, 2019 (JP) .................................. 2019-141334

(51) Int. Cl.
*H04L 69/18* (2022.01)
*H04L 69/08* (2022.01)
(Continued)

(52) U.S. Cl.
CPC ............. *H04L 69/18* (2013.01); *H04L 69/08* (2013.01); *H04L 69/22* (2013.01); *H04W 28/0273* (2013.01)

(58) Field of Classification Search
CPC ......... H04L 69/18; H04L 69/08; H04L 69/22; H04W 88/06; H04W 48/18; H04W 48/20;
(Continued)

(56) References Cited

U.S. PATENT DOCUMENTS 6,904,286 B1 * 6/2005 Dantu ............... H04W 28/0273
455/67.11
7,299,019 B1 * 11/2007 Austin ................... H04W 36/22
455/161.3
(Continued)

FOREIGN PATENT DOCUMENTS

| JP | 2004140459 A | 5/2004 |
|----|--------------|--------|
| JP | 2005315625 A | 11/2005 |

(Continued)

*Primary Examiner* — Jeong S Park
(74) *Attorney, Agent, or Firm* — Harness, Dickey & Pierce, P.L.C.

(57) ABSTRACT

A communication device includes: a first communication unit, a second communication unit, a scheduled position acquisition unit, a specifying unit, and a switching unit that is configured to switch, at a switchable position, a communication protocol of the second communication unit from the second communication protocol, which is currently being used, to the third communication protocol. The first communication unit is further configured to perform communication using the first communication protocol while the switching unit is switching the communication protocol of the second communication unit.

13 Claims, 9 Drawing Sheets

(51) Int. Cl.
*H04L 69/22* (2022.01)
*H04W 28/02* (2009.01)

(58) Field of Classification Search
CPC . H04W 36/18; H04W 88/10; H04W 36/0085; H04W 28/0273
See application file for complete search history.

(56) References Cited

U.S. PATENT DOCUMENTS

| | | | |
|---|---|---|---|
| 8,849,350 B1 | 9/2014 | Batchu et al. | |
| 2003/0137951 A1* | 7/2003 | Otsuka | H04W 36/18 370/328 |
| 2004/0072581 A1 | 4/2004 | Tajima et al. | |
| 2009/0047963 A1* | 2/2009 | Kim | H04W 36/14 455/438 |
| 2011/0211444 A1* | 9/2011 | Das | H04W 36/18 370/219 |
| 2012/0047227 A1 | 2/2012 | Haggerty et al. | |
| 2012/0108206 A1* | 5/2012 | Haggerty | H04M 15/77 455/411 |
| 2013/0150096 A1* | 6/2013 | Hanchate | H04W 4/06 455/466 |
| 2014/0256302 A1* | 9/2014 | Chirayil | H04W 88/06 455/418 |
| 2014/0349705 A1 | 11/2014 | Haggerty et al. | |
| 2015/0016246 A1 | 1/2015 | Morita et al. | |
| 2015/0319664 A1* | 11/2015 | Perras | H04W 36/22 370/331 |
| 2015/0327207 A1 | 11/2015 | Bharadwaj | |
| 2017/0223535 A1 | 8/2017 | Schell et al. | |
| 2018/0041953 A1 | 2/2018 | Lindoff et al. | |
| 2018/0124692 A1* | 5/2018 | Tan | H04W 48/18 |
| 2019/0020720 A1* | 1/2019 | Stahle | H04L 43/0811 |
| 2019/0081898 A1 | 3/2019 | King | H04W 36/22 |
| 2019/0154761 A1* | 5/2019 | Yoshida | H02J 7/0016 |
| 2019/0289505 A1* | 9/2019 | Thomas | H04W 68/04 |
| 2020/0037161 A1 | 1/2020 | Schell et al. | |
| 2020/0068382 A1* | 2/2020 | Kumar | H04W 88/06 |
| 2021/0014755 A1* | 1/2021 | Caceres | H04W 8/08 |
| 2021/0360495 A1* | 11/2021 | Lovlekar | H04W 36/305 |

FOREIGN PATENT DOCUMENTS

| | | |
|---|---|---|
| JP | 2014017878 A | 1/2014 |
| JP | 2014060671 A | 4/2014 |
| JP | 2014120848 A | 6/2014 |
| JP | 2016015607 A | 1/2016 |
| JP | 2016522632 A | 7/2016 |
| JP | 2017050654 A | 3/2017 |
| JP | 2017517958 A | 6/2017 |
| JP | 2019507977 A | 3/2019 |
| WO | WO-2018138894 A1 | 8/2018 |

* cited by examiner

FIG. 2

| COMMUNICATION PROTOCOL | POSITION (LATITUDE, LONGITUDE) | UPSTREAM COMMUNICATION SPEED [Mbps] | DOWNSTREAM COMMUNICATION SPEED [Mbps] |
|---|---|---|---|
| FIRST COMMUNICATION PROTOCOL | 35, 137 | 5 | 30 |
| | 36, 137 | 4 | 25 |
| | 38, 138 | 5 | 30 |
| SECOND COMMUNICATION PROTOCOL | 35, 137 | 5 | 30 |
| | 36, 137 | 2 | 20 |
| | 38, 138 | 0 | 0 |
| THIRD COMMUNICATION PROTOCOL | 35, 137 | 0 | 0 |
| | 36, 137 | 5 | 3 |

(a)

(b)

COMMUNICATION DEVICE FOR CONTINUOUS COMMUNICATION WITH ANOTHER COMMUNICATION DEVICE DURING SWITCH OF COMMUNICATION PROTOCOL

CROSS REFERENCE TO RELATED APPLICATIONS

This application is a continuation application of International Patent Application No. PCT/JP2020/026978 filed on Jul. 10, 2020, which designated the U.S. and claims the benefit of priority from Japanese Patent Application No. 2019-141334 filed on Jul. 31, 2019. The entire disclosure of all of the above application is incorporated herein by reference.

TECHNICAL FIELD

The present disclosure relates to a communication device which is mounted mainly in a moving body and, in particular, relates to an in-vehicle communication device which is mounted in an automobile.

BACKGROUND

To utilize a communication line in a communication terminal device such as a smartphone and a cell phone, an SIM (Subscriber Identity Module) card in which information for specifying subscriber information is recorded is issued from a communication carrier. Then, it becomes possible to utilize the communication line as a subscriber who has contracted the communication line by using the SIM card by inserting it into the communication terminal device. Since, in principle, one SIM card can be inserted into one communication terminal device, one communication terminal device can utilize the communication line that, in principle, one communication carrier provides.

In recent years, a multi-SIM adaptive communication terminal device that a plurality of SIM cards is inserted into one communication terminal device and a plurality of communication lines is utilized by optionally switching between communication protocols by one communication terminal device is appearing. In addition, an eSIM (embedded SIM) adaptive communication terminal device which makes utilization of the plurality of communication lines possible by a single SIM by rewriting subscriber information is also appearing.

For example, a wireless communication device which has a plurality of SIMs and performs communication by using a plurality of wireless access technologies has been known. Such a wireless communication device is the one which performs communication by selecting favorable wireless access technology and communication area on the basis of respective performances of the wireless access technologies and communication areas.

SUMMARY

According to one aspect of the present disclosure, a communication device mounted in a moving body. The device includes: a first communication unit that is configured to perform communication using a first communication protocol; a second communication unit that is configured to perform communication selectively using a second communication protocol and a third communication protocol; a scheduled position acquisition unit that is configured to acquire a plurality of scheduled positions through which the moving body is to pass; a storage unit that is configured to store communication environment information, the communication environment information indicating a communication environment of each of the first to third communication protocols and being set in association with position information; a specifying unit that is configured to specify, based on the communication environment information, a position among the plurality of scheduled positions as a switchable position where communications are available using any one of the first communication protocol, the second communication protocol, and the third communication protocol; and a switching unit that is configured to switch, at the switchable position, a communication protocol of the second communication unit from the second communication protocol, which is currently being used, to the third communication protocol. The first communication unit is further configured to perform communication using the first communication protocol while the switching unit is switching the communication protocol of the second communication unit. The second communication unit is further configured to start communication using the third communication protocol when the switching unit completes switching the communication protocol of the second communication unit.

BRIEF DESCRIPTION OF DRAWINGS

FIG. 2 is a diagram showing communication environment information which is stored in a storage unit in the first embodiment.

DETAILED DESCRIPTION

Figure 1:
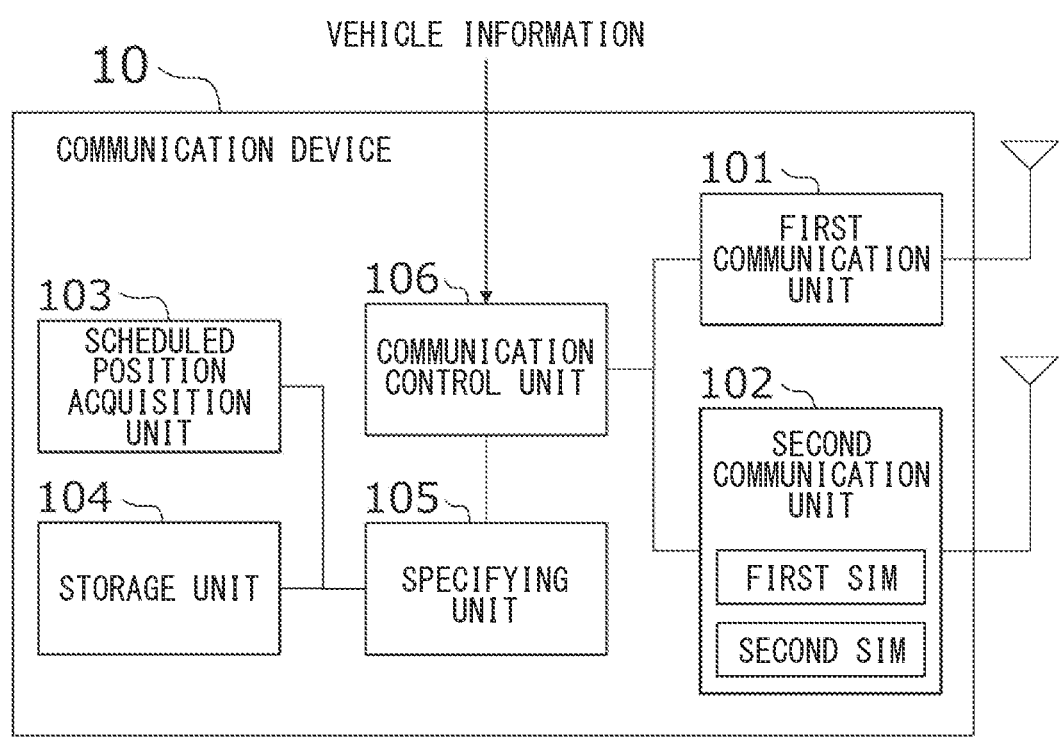
FIG. 1 is a diagram showing a configuration of a communication device of a first embodiment.

To begin with, a relevant technology of the present disclosure will be described only for understanding the following embodiments.

When switching between the communication protocols which have been set in correspondence with the multi-SIM and the eSIM, data transmission and reception cannot be performed while switching between the communication protocols and thereby the communication is disrupted. For this reason, in the communication terminal device which transmits and receives data that requires a real-time response, there is such a problem that such communication protocol switching cannot be performed. In addition, even in a case of transmitting and receiving data that does not require the real-time response, since a waiting time generates for users due to communication disruption while switching between the communication protocols, convenience for users would be deteriorated.

For example, in a communication device which is to be mounted in an autonomous driving vehicle that automatically operates by constantly transmitting and receiving data which is used to control the vehicle, the communication disruption due to switching between the communication protocols is not desirable. Accordingly, the present inventors have found that it is possible to continuously perform data transmission and reception with no communication disruption by performing communication using a communication unit which is different from a communication unit which performs communication protocol switching while switching between the communication protocols.

An objective of the present disclosure is to provide a communication device which can continuously transmit and receive data with no disruption of communication when switching the communication protocol for use.

As described above, according to the one aspect of the present disclosure, a communication device is mounted in a moving body. The device includes: a first communication unit that is configured to perform communication using a first communication protocol; a second communication unit that is configured to perform communication selectively using a second communication protocol and a third communication protocol; a scheduled position acquisition unit that is configured to acquire a plurality of scheduled positions through which the moving body is to pass; a storage unit that is configured to store communication environment information, the communication environment information indicating a communication environment of each of the first to third communication protocols and being set in association with position information; a specifying unit that is configured to specify, based on the communication environment information, a position among the plurality of scheduled positions as a switchable position where communications are available using any one of the first communication protocol, the second communication protocol, and the third communication protocol; and a switching unit that is configured to switch, at the switchable position, a communication protocol of the second communication unit from the second communication protocol, which is currently being used, to the third communication protocol. The first communication unit is further configured to perform communication using the first communication protocol while the switching unit is switching the communication protocol of the second communication unit. The second communication unit is further configured to start communication using the third communication protocol when the switching unit completes switching the communication protocol of the second communication unit.

According to a second aspect of the present disclosure, a communication method is executed by a communication device mounted in a moving body. The communication device includes a first communication unit that is configured to perform communication using a first communication protocol and a second communication unit that is configured to perform communication selectively using a second communication protocol and a third communication protocol. The method includes: acquiring a plurality of scheduled positions through which the moving body is to pass; specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information; switching, at the switchable position, a communication protocol of the second communication unit from the second communication protocol, which is currently being used, to the third communication protocol; performing, with the first communication unit, communication using the first communication protocol while the communication protocol of the second communication unit is being switched; and starting, with the second communication unit, performing communication using the third communication protocol upon completing switching the communication protocol of the second communication unit.

According to a third aspect of the present disclosure, a communication program product is for a communication device mounted in a moving body. The communication device includes a first communication unit that is configured to perform communication using a first communication protocol and a second communication unit that is configured to perform communication selectively using a second communication protocol and a third communication protocol. The communication program product is stored on a computer readable medium and includes instructions configured to, when executed, cause a processor to: acquire a plurality of scheduled positions through which the moving body is to pass; specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information; switch, at the switchable position, a communication protocol of the second communication unit from the second communication protocol, which is currently being used, to the third communication protocol; perform, with the first communication unit, communication using the first communication protocol while the communication protocol of the second communication unit is being switched; and start, with the second communication unit, performing communication using the third communication protocol upon completing switching the communication protocol of the second communication unit.

According to a fourth aspect of the present disclosure, a communication control device is configured to communicate with a communication device mounted in a moving body and is equipped with a first communication unit that is configured to perform communication using a first communication protocol and a second communication unit that is configured to perform communication selectively using a second communication protocol and a third communication protocol, the first communication unit being configured to perform communication using the first communication protocol during switching of a communication protocol of the second communication unit. The second communication unit is configured to start performing communication using the third communication protocol upon completing switching the communication protocol of the second communication unit. The communication control device includes: a receiving unit that is configured to receive a plurality of scheduled positions through which the moving body is to pass from the communication device; a storage unit that is configured to store communication environment information, the communication environment information indicating a communication environment of each of the first to third communication protocols and being set in association with position information; a specifying unit that is configured to specify a position among the plurality of scheduled positions as a switchable position where communications are available using any one of the first communication protocol, the second communication protocol, and the third communication protocol based on the communication environment information; and a transmission unit that is configured to transmit, to the communication device, a signal for instructing the second communication unit to switch its communication protocol from the second communication protocol, which is currently being used, to the third communication protocol at the switchable position.

According to a fifth aspect of the present disclosure, a communication control method is executed by a communication control device that is configured to communicate with a communication device mounted in a moving body. The communication device includes a first communication unit that is configured to perform communication using a first communication protocol and a second communication unit that is configured to perform communication selectively using a second communication protocol and a third communication protocol. The first communication unit is configured to perform communication using the first communication protocol while a communication protocol of the second communication unit is being switched. The second communication unit is configured to start performing communication using the third communication protocol upon completing switching the communication protocol of the second communication unit. The communication control method includes: receiving a plurality of scheduled positions through which the moving body is to pass from the communication device; specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information; transmitting, to the communication device, a signal for instructing the second communication unit to switch its communication protocol from the second communication protocol, which is currently being used, to the third communication protocol at the switchable position.

According to the communication device, the communication method, the communication program product, the communication control device, and the communication controlling method of the present disclosure, when switching the communication protocol, it is possible to continuously perform communication with no disruption of communication with another communication device.

In the following, embodiments of the present disclosure will be described with reference to the drawings.

Incidentally, the present disclosure which is indicated in the following means the disclosure which has been described in the scope of claims and is not limited to the following embodiments. In addition, at least a phrase which is within double-quotations means a phrase which has been described in the scope of claims and is not also limited to the following embodiments.

Configurations and methods which are described in dependent claims of the scope of claims, configurations and methods of embodiments which correspond to the configurations and the methods which are described in the dependent claims and configurations and methods which are not described in the scope of claims and are described only in the embodiments are optional configurations and methods in the present disclosure. Also, configurations and methods which are described in the embodiments in a case where description of the scope of claims is wider than description of the embodiments are optional configurations and methods in the present disclosure in the sense that they are exemplifications of the configurations and the methods of the present disclosure. In either case, they become essential configurations and methods of the present disclosure by describing them in independent claims of the scope of claims.

Effects which have been described in the embodiments are effects in a case of having the configuration of the embodiment as the exemplification of the present disclosure and are not necessarily the effects that the present disclosure has.

In a case where there exists a plurality of embodiments, the configuration which is disclosed in each embodiment is not the one which is closed only in each embodiment and it is possible to combine them together striding over the embodiments. For example, the configuration which is disclosed in one embodiment may be combined with another embodiment. In addition, the configurations which are disclosed in the plurality of embodiments respectively may be gathered and combined together.

A finding and a subject which have been described in the present disclosure are not well-known subject and are the ones that the present inventor has found uniquely and are facts which affirm the inventive step of the disclosure together with the configurations and the methods of the present disclosure.

First Embodiment

FIG. 1 illustrates a communication device 10 of the present embodiment. The communication device 10 in the following embodiment is an in-vehicle communication device which is to be mounted in a "moving body" such as a vehicle and so forth. In particular, the in-vehicle communication device 10 which is to be mounted in an autonomous driving vehicle periodically receives information on the surroundings of its own vehicle such as other vehicles, obstacles, pedestrians and so forth and periodically transmits vehicle information such as the position of its own vehicle, control data thereof and so forth to other communication devices such as a server, other vehicles, roadside infrastructures and so forth. However, the present disclosure includes a communication device for the one other than an in-vehicle application unless otherwise limited in the scope of claims.

Here, the "moving body" means a movable object and a moving speed thereof is optional. In addition, it of course also includes a case where the moving body is at a standstill. Further, it does not matter whether the moving body is manned or unmanned. The moving body includes, for example, automobiles, motorcycles, bicycles, pedestrians, marine vessels, aircrafts and objects which are loaded thereon or are carried thereby, or are not limited thereto. In addition, for example, cell phones, smartphones, tablet-type computers (tablet PCs), portable personal computers, wearable terminals with a communication function being loaded thereon are included in the ones which are loaded on or carried by the moving body.

The communication device 10 of the present embodiment which is illustrated in FIG. 1 is equipped with a first communication unit 101, a second communication unit 102, a scheduled position acquisition unit 103, a storage unit 104, a specifying unit 105, and a communication control unit 106.

The first communication unit 101 is a "communication unit" which performs "communication" by using a first "communication protocol". The second communication unit 102 is a "communication unit" which performs "communication" by using a second "communication protocol" or a third "communication protocol", and is a multi-SIM type or eSIM type communication unit. The second communication unit 102 which is illustrated in FIG. 1 indicates an example of a dual SIM communication unit which has a first SIM and a second SIM. Profile information which is information for specifying subscriber information is recorded in these SIMs and it is possible for the second communication unit 102 to perform communication by switching between two communication protocols which are mutually different in communication standard and communication carrier by switching the SIM to be used. In this example, the first SIM is correlated with the second communication protocol and the second SIM is correlated with the third communication protocol. In addition, when the eSIM is adopted in place of the dual SIM which is illustrated in FIG. 1, it is possible for the second communication unit 102 to perform communication by switching between two communication protocols which are different from each other in communication standard and communications carrier by rewriting the profile information of the eSIM.

Here, the "communication protocol" of course indicates a communication standard such as, for example, 3G, 4G, 5G, LPWA (Low Power Wide Area), Wi-Fi (the registered trademark), Bluetooth (the registered trademark) and so forth, also includes specifications of these communication standards (for example, eMBB (enhanced Mobile Broadband), URLLC (Ultra-Reliable and Low Latency Communications), mMTC (massive Machine Type Communication) in the 5G) and further includes also communication standards which come after the next generation of these communication standards and are derived from these communication standards.

Here, "to perform communication" means that it is sufficient as long as it is possible to perform communication and may not be the one which always performs communication.

It is sufficient for the "communication unit" to have a communication function and of course a communication device as a finished product and also semifinished products of an electronic control device, a communication module and so forth and components such as a semiconductor chip, a semiconductor module and so forth are included. In addition, in a case of wireless communication, it includes antennas.

As illustrated in FIG. 1, the first communication unit 101 and the second communication unit 102 have the antennas respectively and it may be said that they are functionally independent communication modules. Accordingly, the first communication unit 101 and the second communication unit 102 can be used at the same time. Therefore, for example, while the second communication unit 102 is transmitting and receiving data by using the second communication protocol, also the first communication unit 101 may be brought into a communicable state.

Although, in the present embodiment, an example that the first communication unit 101 uses one communication protocol and the second communication unit 102 uses two communication protocols will be described, these communication units may by the ones which further use other communication protocols. For example, the first communication unit may be the multi-SIM type communication unit which is the same as the second communication unit and the second communication unit may be a communication unit which has three or more SIMs. In addition, the first to third communication protocols are optional communication protocols. For example, the first communication protocol is a short-range wireless communication protocol such as the Wi-Fi (the registered trademark), DSRC (Dedicated Short Range Communications) scheme which is used for communication with the roadside machine and so forth and the second and third communication protocols are long-range wireless communication protocols such as the 3G, the 4G and so forth. However, the first to third communication protocols are not limited to these examples. For example, both the first communication unit 101 and the second communication unit 102 may be multi-SIM type communication units and may perform communication by utilizing the long-range wireless communication protocol. In particular, in a case where the first communication unit 101 and the second communication unit 102 are different from each other in communicable Long-range wireless communication protocol, it becomes possible to continue communication by complementarily switching between communication protocols which are used in these communication units.

In addition, in embodiments which will be described in the following, other communication devices which perform communication with the communication device 10 are, communication devices which are installed outside the vehicle such as a base station, the server and so forth are supposed. However, the communication device 10 may perform communication between it and a communication device such as the smartphone and so forth which are loaded on the vehicle in place of the external communication devices.

The scheduled position acquisition unit 103 acquires information which indicates a scheduled movement "position" to which the vehicle schedules to move. For example, in a case where the vehicle is the autonomous driving vehicle, a scheduled route that it travels to its destination is obtained in advance by an autonomous driving system. In addition, even in a case where the vehicle is manually operated by a driver, a recommended route up to the destination is obtained in advance by a car navigation system. Accordingly, the scheduled position acquisition unit 103 acquires the scheduled positions of the vehicle from the route which has been obtained in advance by the autonomous driving system and the car navigation system.

Here, the "position" means a plurality of or single specific point(s), and a line, a plane and a solid body may be formed as a set of positions.

The storage unit 104 is a nonvolatile memory such as a flash memory, a hard disc (HDD) and so forth or a volatile memory such as a DRAM, an SRAM and so forth and stores "communication environment information" which indicates communication environments of the first, second and third communication protocols.

The "communication environment information" may be, of course, the one which indicates the quality of communication such as, for example, a communication speed, BER (Bit Error Rate), PER (Packet Error Rate), RSRP (Reference Signal Received Power), RSSI (Received Signal Strength Indicator), RSRQ (Reference Signal Received Quality), SINR (Signal-to-Interference plus Noise power Ratio), the number of connection terminals in a specific area, the number of connection terminals at a specific access point, past connection achievements and so forth and may be the one which indicates whether communication is possible or the position of the base station and also may be a predicted value which has been calculated from past information and a current communication situation.

Here, there are cases where the communication environment of the communication protocol differs depending on the position of the communication device 10. For example, even in the same communication protocol, there are cases where radio waves are interrupted by buildings and so forth at a point A and the communication speed is low, and the communication speed is high at a point B because a radio wave situation is favorable. Accordingly, the communication environment information per communication protocol which was set in correspondence with the position information is stored in the storage unit 104. In addition, azimuth information of an antenna of a communication terminal may be included in the communication environment information. This is because even when the communication device 10 is at the same position, the communication environment information differs in accordance with an azimuth relative to a communication partner.

FIG. 2 shows one example of the communication environment information which is to be stored into the storage unit 104. According to FIG. 2, latitude/longitude, an upstream communication speed and a downstream communication speed which have been set in correspondence with the latitude/longitude are stored as the communication environment information for each of the communication protocols. For example, according to FIG. 2, in the second communication protocol, the upstream communication speed at latitude/longitude (36, 137) is 2 Mbps and the downstream communication speed thereat is 20 Mbps. In addition, the upstream and downstream communication speeds at latitude/longitude (38, 138) are both 0s and it is found that the communication cannot be performed by using the second communication protocol at this position. Incidentally, in a case where communication cannot be performed, information which indicates that the communication cannot be performed may be stored in place of the value 0.

The communication speeds which are indicated in FIG. 2 are merely one example of the communication environment information and optional communication environment information other than the communication speeds may be stored into the storage unit 104. For example, the storage unit 104 may further store therein information which indicates a past communication history per communication protocol such as the number of times that it connected with another communication device and the number of times that it transmitted and received data in the past at each position. In addition, also information which indicates a degree of reliability of the communication environment information which is stored in the storage unit 104 such as the number of pieces of calculation source data, a standard deviation and so forth of the communication environment information may be stored. Further, information other than the communication environment information such as, for example, communication charge information and so forth in a case of utilization of each communication protocol and so forth may be stored into the storage unit 104.

In addition, the communication environment information which is to be stored into the storage unit 104 may be stored in advance in, for example, a factory and a store, may be manually updated by the store and the user, or the communication environment information may be periodically received from the server by using wireless communication and may be automatically updated. In a case where the communication environment information is updated, since real-time communication environment information which reflected the communication situation of a dynamically changing user distribution and so forth such as the number of communication terminal devices which utilize the communication protocol, a resource usage rate or a resource quota of the communication protocol concerned and so forth can be acquired, for example, it becomes possible to select an optimum communication protocol when performing communication protocol switching processing which will be described later.

The specifying unit 105 of the present embodiment specifies a position that communication is possible even when using any one of the first communication protocol, the second communication protocol and the third communication protocol in the scheduled positions of the vehicle as a switchable position that the communication protocol can be switched on the basis of the communication environment information which has been stored into the storage unit 104. The specifying unit 105 transmits the specified switchable position to the communication control unit 106.

The switchable position is an optional position that communication is possible even when using any one of the first, second and third communication protocols. For example, there are cases where the vehicle moves and thereby it moves from a position that the communication quality of the communication protocol which is being used is favorable to a position that the communication quality is inferior. In this case, the specifying unit 105 further specifies a position (or a first reference position) where the communication quality of the communication protocol which is being used falls to be "equal to or less than" a "predetermined" quality threshold value and specifies, as the switchable position, a position through which the vehicle passes before the first reference position.

Here, the "predetermined" also includes a case where it is uniquely determined in accordance with a condition in addition to a case where it is always fixed. "Less than", "more than" are, both of a case of including a value which is the same as that of a comparison object and a case of not including it are included. The same shall apply hereinbelow.

In the following, a case where the communication speed 0 bps is set in advance for the quality threshold value and the communication protocol which is being used is the second communication protocol will be considered. In the example which is indicated in FIG. 2, the position that the communication speed of the second communication protocol becomes less than the quality threshold value (0 bps) is the latitude/longitude (38, 138). Thus, the specifying unit 105 specifies the position (38, 138). Next, the specifying unit 105 specifies a position that any of the communication speeds of the first, second and third communication protocols is not 0 and it can communicate with another communication device in the scheduled positions that the vehicle passes before it passes the latitude/longitude (38, 138) in terms of time, for example, the latitude/longitude (36, 137) as the switchable position.

Here, a position that it becomes less than the quality threshold value 0 bps is the position that it becomes impossible to perform communication by using the communication protocol which is being used because of deviation from a communication area and so forth. In this case, since communication protocol switching processing which will be described later can be performed before it becomes impossible to perform communication by using the communication protocol which is being used, sudden disruption of the communication can be prevented.

As a matter of course, the quality threshold value is not limited to the communication speed. In addition, whether the communication quality of the communication protocol which is being used is less than a predetermined quality threshold value may be comprehensively decided also from one or more of various parameters which indicate the communication quality.

In addition, it is a matter of course that the communication quality which is to be compared with the quality threshold value of course includes a communication quality at a specific point and it may be a value that communication qualities which are obtained over a predetermined distance have been averaged. For example, in a case where although the communication quality is remarkably lowered at the specific point by averaging the communication qualities, the communication quality is recovered when the vehicle moves by several meters, it prevents it from being decided that the communication quality of the communication protocol which is being used is less than the quality threshold value. That the frequency of the communication protocol switching processing which will be described later becomes high can be suppressed by configuring in this way and that a load on the communication device is increased and a processing delay occurs and that the communication becomes unstable by frequent switching between the communication protocols can be prevented eventually.

The communication control unit 106 controls the first and second communication units 101, 102. Specifically, the communication control unit 106 (corresponds to the [switching unit]) switches the communication protocol of the second communication unit 102 by using the profile information which is stored in the SIM at the switchable position that the specifying unit 105 has specified. Communication carrier subscriber information which is necessary to perform wireless communication and communication service information are included in the profile information. The communication control unit 106 further controls such that the first communication unit 101 performs communication by using the first communication protocol "while switching" the communication protocol of the second communication unit 102. For example, the communication control unit 106 transmits vehicle information that it acquired by various sensors which have been loaded on the vehicle to the first communication unit 102 while switching the communication protocol of the second communication unit 102 and transmits the vehicle information to the second communication unit 102 at completion of the switching processing. As described above, since the second communication unit 102 cannot perform communication while switching the communication protocol of the second communication unit 102, it transmits the vehicle information to the first communication unit 101 and then the first communication unit 101 communicatees with another communication device and thereby generation of a period that the vehicle information cannot be transmitted is prevented.

Here, "while switching" may include the period that communication cannot be performed even when using both the second communication protocol and the third communication protocol and may be also the one which includes a period of using the first communication protocol and the second or third communication protocol in superposition.

Figure 3:
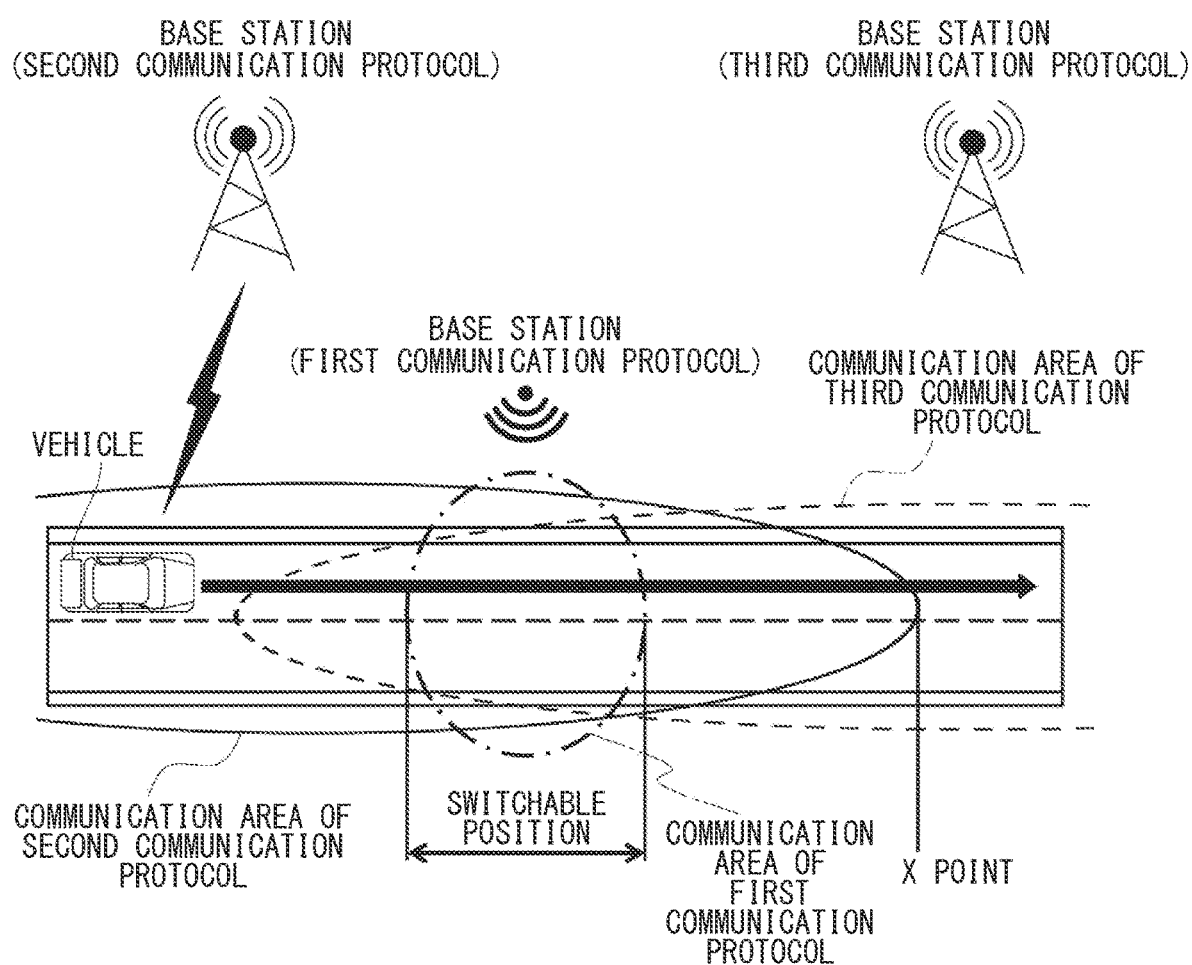
FIG. 3 is a diagram illustrating traveling of a vehicle in which the communication device of the first embodiment is mounted.

FIG. 3 illustrates a state where a vehicle with the communication device 10 of the present embodiment loaded thereon is traveling along the road. In this example, the first communication protocol is the DSRC system, a one-point chained line circle indicates a communication area of a base station such as a roadside machine or the like which has been installed along the road. In addition, a solid-line circle which is illustrated in FIG. 3 indicates a communication area of a base station of the second communication protocol, a broken-line circle indicates a communication area of a base station of the third communication protocol. It is impossible to perform communication by using the corresponding communication protocol on the outer side of the communication area of each communication protocol. For example, at a position of the vehicle which is illustrated in FIG. 3, it is impossible to perform communication by using the first and third communication protocols.

As illustrated in FIG. 3, the vehicle is traveling within the communication area of the second communication protocol and communicates with the base station by using the second communication protocol. In a case where the vehicle continues to travel as it is and has passed an X point, the vehicle goes out of the communication area of the second communication protocol and therefore it becomes impossible for it to communicate with the base station by using the second communication protocol.

Accordingly, when the specifying unit 105 specifies the X point that the vehicle goes out of the communication area of the second communication protocol and it becomes impossible for it to perform communicate by the second communication protocol on the basis of the communication environment information, it specifies a position that the vehicle passes before the time that it passes the X point in terms of time and communication is possible by using the first, second and third communication protocols as the switchable position.

When the vehicle reaches the switchable position, it switches the communication protocol of the second communication unit 102 from the second communication protocol to the third communication protocol. Then, while switching the communication protocol of the second communication unit 102, the first communication unit 101 performs communication between it and the roadside machine by using the first communication protocol. At completion of switching of the communication protocol of the second communication unit 102, the second communication unit 102 starts communication with the base station by using the third communication protocol. As a result, even when the vehicle reaches the X point, it can continue communication.

Incidentally, in a case where the specifying unit 105 was specified a plurality of switchable positions, the communication protocol may be switched by selecting the switchable position that the vehicle passes first or the switchable position which is the highest in communication quality of the first communication protocol in the plurality of switchable positions.

In addition, in a case where the communication area of the roadside machine which is illustrated in FIG. 3 is narrow, that a time for which the vehicle moves within the communication area of the roadside machine is shorter than a time which is required to switch from the second communication protocol to the third communication protocol would occur. Thus, the specifying unit 105 may specify the switchable position that a time for which the vehicle moves the switchable position becomes longer than a time for communication protocol switching in the plurality of switchable positions. However, even in a case where the specifying unit 105 can specify only the switchable position that the time for which the vehicle moves is shorter than the time for communication protocol switching, it is desirable to perform switching between the communication protocols at the switchable position concerned and to perform communication by using the first communication protocol while switching.

Thereby, a time for which communication is disrupted at the time of communication protocol switching can be shortened as much as possible.

In addition, also in a case where the switchable position has a fixed distance as illustrated in FIG. 3, it is the same as the case where there exists the plurality of switchable positions. For example, in a case where the switchable position which is illustrated in FIG. 3 ranges from several meters to several hundred kilometers, the communication protocol may be switched immediately when the vehicle reaches the switchable position, and the communication protocol may be switched at a time point that the communication quality which is obtained in the range from several meters to several hundred kilometers becomes the highest.

Figure 4:
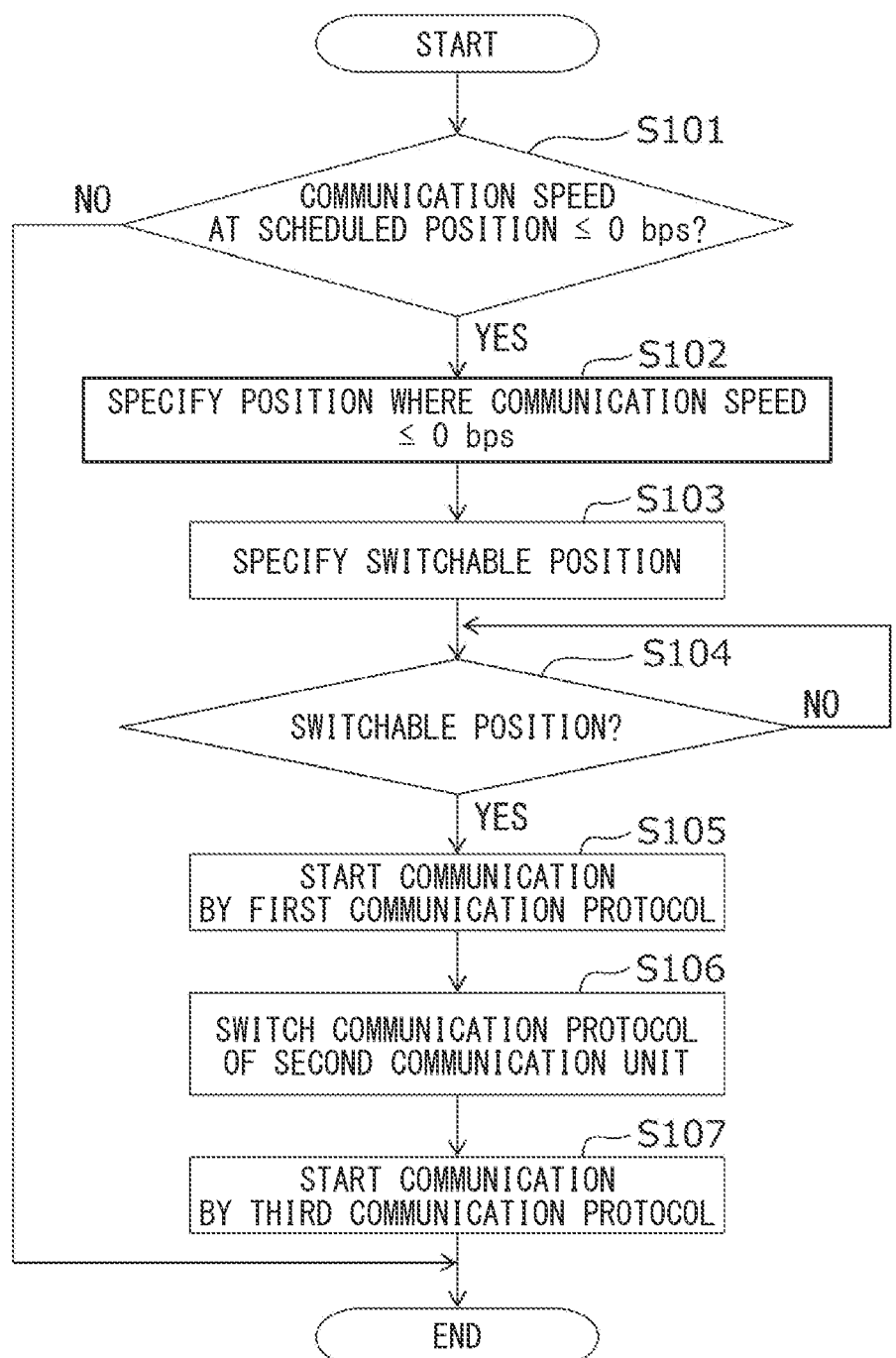
FIG. 4 is a diagram explaining an operation of the communication device of the first embodiment.

Next, an operation conducted by the communication device 10 will be described by using FIG. 4. FIG. 4 indicates the operation in a case where the communication speed which is 0 bps is set in advance as the quality threshold value similarly to the above-mentioned example.

At S101, the device 10 determines whether a position where the communication quality of the communication protocol that is currently being used is equal to or less than 0 bps which is the quality threshold value is included in the scheduled positions of the vehicle on the basis of the communication environment information which is stored in the storage unit 104.

If the position where the communication quality is equal to less than 0 bps is not included in the scheduled positions of the vehicle (S101: No), that is, if the device 10 can perform communication continuously by using the communication protocol which is currently being used, it terminates processing. In contrast thereto, if the position where the communication quality which is currently being used is equal to or less than 0 bps is included in the scheduled positions of the vehicle (S101: Yes), it specifies the position at S102.

At S103, the position where communications are available using any one of the first communication protocol, the second communication protocol and the third communication protocol is specified as the switchable position in the scheduled positions. This switchable position is the position through which the vehicle passes prior to the position that was specified at S102.

At S104, when the vehicle reaches the switchable position (S104: Yes), the first communication unit 101 starts communication with another communication device using the first communication protocol (S105). Then, when communication by the first communication unit 101 is started at S105, in S106, it switches the communication protocol of the second communication unit 102 from the second communication protocol, which is currently being used, to the third communication protocol.

Upon completion of switching the communication protocol of the second communication unit 102, it starts communication with another communication device using the third communication protocol which is the communication protocol after switched (S107).

It should be noted that whether the vehicle has reached the switchable position in S104 in FIG. 4 can be determined by using position information of the vehicle which was received through, for example, a GNSS receiver mounted in the vehicle. The GNSS receiver receives the position information from at least one satellite navigation system in satellite navigation systems such as GPS, GLONASS, Galileo, IRNSS, QZSS, Beidou and so forth. As another example, it calculates a time that the vehicle reaches the switchable position on the basis of the position and the speed of the vehicle when it has specified the switchable position and when it detected that the calculated time has come, it may decide that the vehicle has reached the switchable position.

In the above-mentioned example, although a situation where the communication quality is lowered or the vehicle moves to an outside of the communication area and thereby no communication is available has been explained, as another example, even when the communication quality of the second communication protocol is not lowered and is fixed, if a communication protocol having a higher communication quality than the currently-used communication protocol is available, the communication protocol may be switched thereto. For example, the specifying unit 105 specifies a position (a second reference position) where the communication quality of the second communication protocol falls to be equal to or lower than the communication quality of the third communication protocol. Then, it specifies a position which is closest to the second reference position as the switchable position and switches the communication protocol. Here, if the position where the communication quality of the second communication protocol is equal to or lower than the communication quality of the third communication protocol overlaps with the switchable position, this overlapping position becomes the switchable position.

Figure 5:
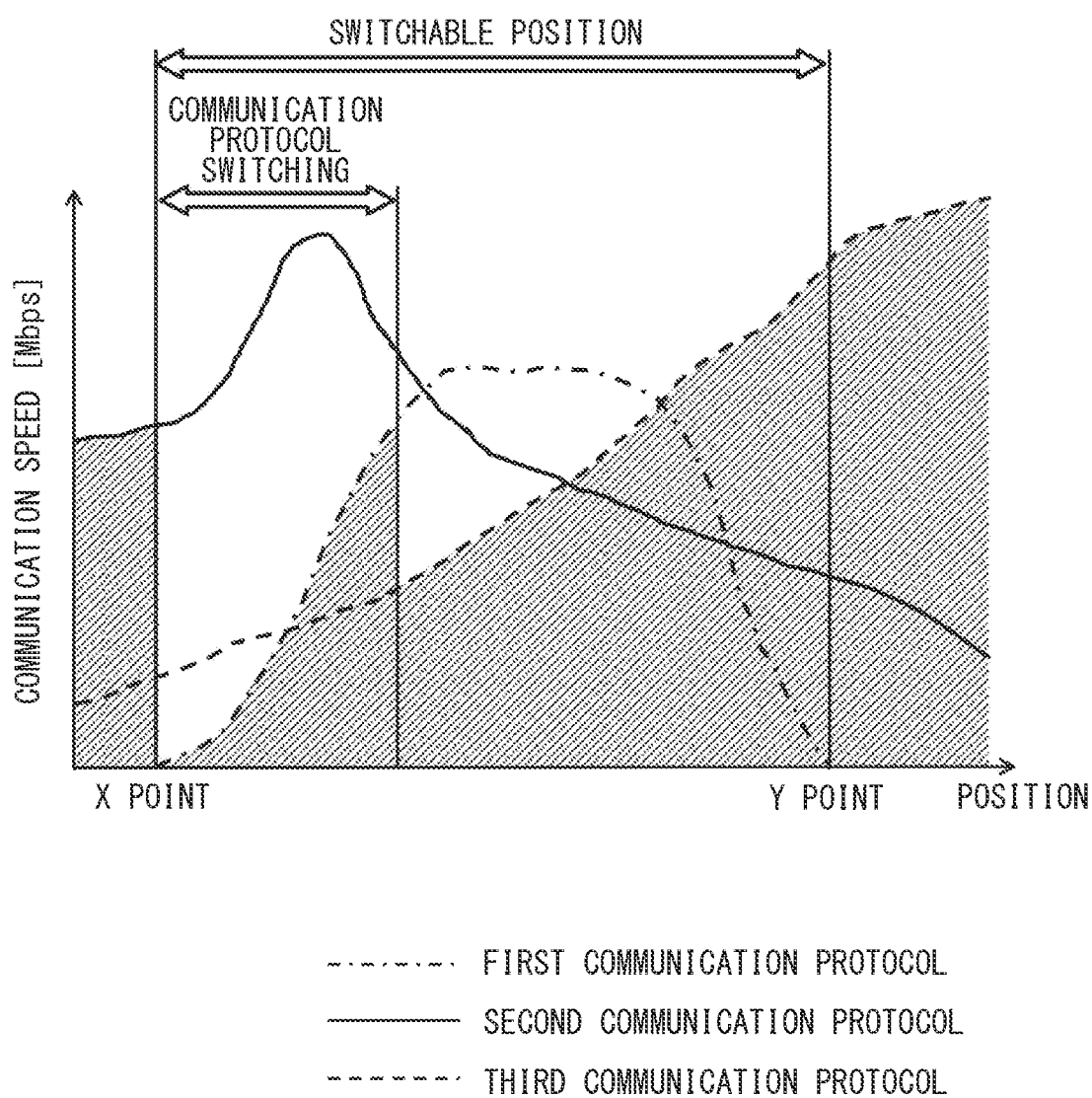
FIG. 5 is a diagram explaining a timing of switching between communication protocols in the communication device of the first embodiment.
Figure 6:
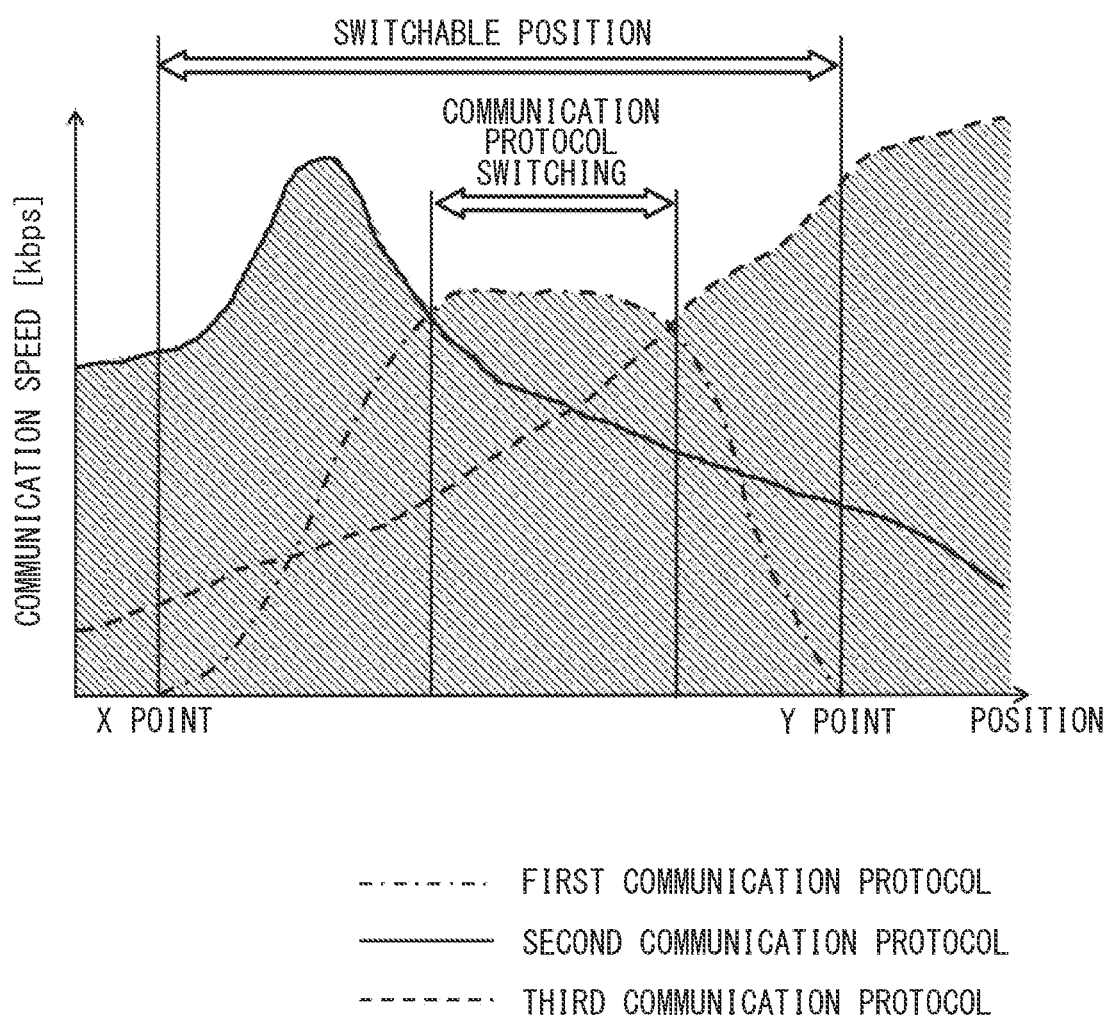
FIG. 6 is a diagram explaining a timing of switching between the communication protocols in the communication device of the first embodiment.

FIGS. 5 and 6 show graphs which indicate the communication speed of each communication protocol that are set in association with the position information. According to these graphs, a region from the X point to a Y point is the switchable positions and hatched ranges indicate communication speeds obtained from each of the communication protocols currently used.

For example, in FIG. 5, communication is performed by using the second communication protocol until the vehicle arrives the X point and starts switching of the communication protocol of the second communication unit 102 at the X point where the communication speed of the first communication protocol exceeds 0 bps. Then, communication is performed by using the first communication protocol while the communication protocol of the second communication unit 102 is being switched and communication is started by using the third communication protocol upon completion of switching the communication protocol.

In addition, FIG. 6 illustrates an example where switching of the communication protocol is performed at a timing different from that in FIG. 5. In the example in FIG. 6, the communication protocol is switched at a point where, from increase and decrease in communication speed of each communication protocol, a sum of communication speeds which are obtained before and after communication protocol switching is increased and it is found that the communication speeds which are obtained in a duration from the X point to the Y point are high in comparison with those in FIG. 5. In other words, the communication protocol is switched at a cross-point where the graph of one of the communication protocol and the graph of another of the communication protocol crosses. In this case, the second communication unit 102 can perform communication by utilizing a communication protocol which has an always high communication quality. That is, the unit 102 always uses one of the communication protocols that has a higher communication speed than other two protocols. Incidentally, communication protocol switching timings illustrated in FIGS. 5, 6 are merely examples and the communication protocol may be switched at optional timings as long as the position is included in the switchable positions. For example, communication protocol switching may be done at a point where the communication speed of the second communication protocol, which is currently being used, falls below the communication speed of the third communication protocol.

It should be noted that, in the above-mentioned first embodiment, the second communication unit 102 performs communication by using two communication protocols, that is, the second and third communication protocols. However, the second communication unit may use three or more of the communication protocols. In this case, the specifying unit 105 may specify the communication protocol having the highest communication quality from among three or more of the communication protocols. Alternatively, if communication fees information (for example, transmission and reception fees per bit) for each communication protocol is stored in the storage unit 106, the specifying unit 105 may specify the communication protocol having the lowest fees.

As above, according to the first embodiment, it is possible to prevent communication disruption which would occur when switching between the communication protocols by using the first communication unit while the communication protocol of the second communication unit is being switched.

Further, according to the first embodiment, communication can be continuously performed while maintaining the predetermined communication quality by specifying in advance the position where the communication quality of the communication protocol, which is currently being used, decreases and switching between the communication protocols before the vehicle reaches that position.

Modified Example 1

If the communication speed of the communication protocol is slow, a time required for data transmission is increased. In particular, if a volume of data that is transmitted from the communication device 10 to another communication device is large, this problem more obviously generates. Accordingly, it would be difficult for a large amount of data to be transmitted in real time to another communication device if transmission time increases. In particular, for an autonomous driving vehicle which autonomously operates based on information received via wireless communication, there is a fear of affecting traveling of the autonomous driving vehicle if the vehicle cannot transmit and receive data in real time. In addition, if a plurality of pieces of application software performs communication by using a communication device and then if one specific application software transmits a large volume of data, it would be impossible for other pieces of application software to transmit data and thus the convenience would be worsen.

Accordingly, in the present modified example, switching between the communication protocols is performed in accordance with the volume of data that is transmitted to another communication device.

The communication control unit 106 in the present modified example obtains a first transmission time which is a time required to complete data transmission by using the second communication protocol which is currently being used and a second transmission time which is a time required to complete transmission of the data by using the third communication protocol on the basis of the communication speed included in the communication environment information of the second communication protocol which has been stored in the storage unit 104. Then, if the first transmission time is "equal to or more than" a "predetermined" time threshold value and the second transmission time is "equal to or less than" the "predetermined" time threshold value, the communication control unit 106 executes switching of the communication protocol of the second communication unit 102.

For example, it is assumed that 1 second is set in advance as the predetermined time threshold value and the volume of data to be transmitted is 5 M bits. Since the upstream communication speed at the latitude/longitude (36, 137) of the second communication protocol is 2 Mbps as shown in FIG. 2, the time required to complete data transmission, that is, the first transmission time is 2.5 seconds. On the other hand, since the upstream communication speed at the latitude/longitude (36, 137) of the third communication protocol is 5 Mbps, the second transmission time is 1 second. Therefore, the first transmission time (2.5 seconds) is more than the predetermined time threshold value (1 second) and the second transmission time (1 second) is less than the predetermined time threshold value. Accordingly, the communication control unit 106 executes switching the communication protocol of the second communication unit 102 from the second communication protocol to the third communication protocol at the switchable position specified by the specifying unit 105.

In addition, when a position and a timing at which large volume data is transmitted are known in advance, the specifying unit 105 may specify a position, as the switchable position, through which the vehicle is to pass before reaching the position and the time that has been known.

According to the present modified example, when the large volume of data is transmitted, data transmission can be carried out effectively by switching to the communication protocol which is suited for transmission of the data.

Modified Example 2

In the communication protocol using a SIM, maximum data volume available per month or per day, for example, may be set in advance under contract between a user and a communication carrier which issues the SIM. If communication is performed in excess of the maximum data volume, there is a concern that the communication itself would be restricted or the communication speed would be remarkably lowered. In a communication unit using a plurality of SIMs, communication may be performed by using one communication protocol until the remaining data quantity decreases to 0 and then the communication protocol may be switched to another communication protocol at the timing the remaining data quantity reaches 0. However, when the vehicle moves to a communication area where only one communication protocol works after the remaining data quantity for the communication protocol reached 0, communication cannot be performed. Accordingly, in the present modified example, switching between the communication protocols is performed in accordance with the remaining data quantity of each of the communicant protocols.

The storage unit 104 stores therein remaining data quantities (in the following, communication remaining quantities) of the second and third communication protocols in addition to the communication environment information. These communication remaining quantities are always updated in accordance with data quantities that are used via each communication protocol. The communication remaining quantity may be periodically transmitted by, for example, the communication carrier who provides each communication protocol or may be stored in the communication device by a shop (e.g., a dealer) or the user.

The communication control unit 106 in the present modified example obtains a "difference" between a first communication remaining quantity which is a communication remaining quantity of the second communication protocol and a second communication remaining quantity which is a communication remaining quantity of the third communication protocol based on the communication remaining quantities stored in the storage unit 104. Then, if the obtained difference is equal to or greater than a difference threshold value that is set in advance, the communication control unit 106 executes switching of the communication protocol of the second communication unit 102 from the second communication protocol to the third communication protocol at the switchable position that is specified by the specifying unit 105.

Here, it is sufficient for the "difference" if a subtraction be included, and thus the difference may include not only a simple difference (y−x) but also a squared difference (y2−x2), a square root of difference ((y−x)1/2), a weighted difference (by−ax: a, b are constants) and so forth.

Figure 7:
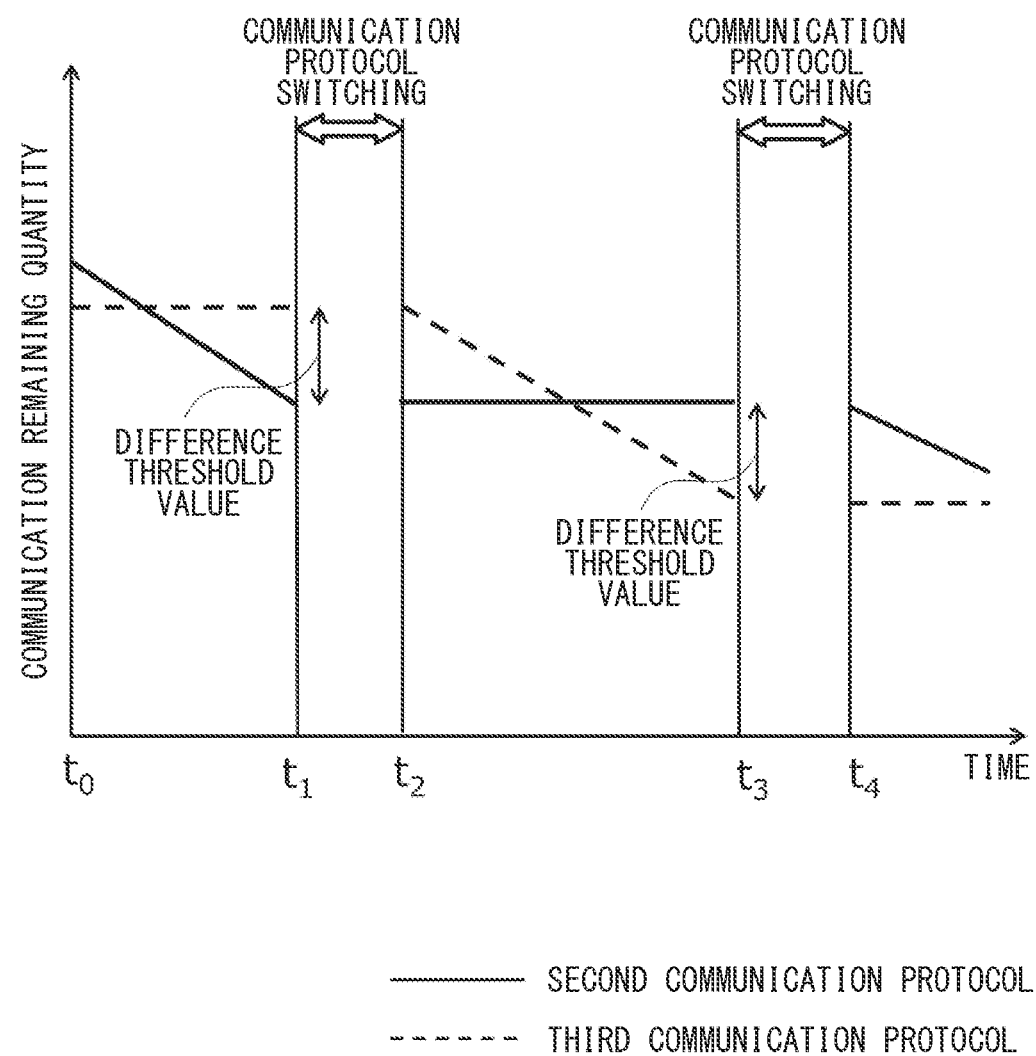
FIG. 7 is a diagram explaining a timing of switching between the communication protocols in a communication device of a modified example 2 of the first embodiment.

FIG. 7 is a graph indicating relations between communication remaining quantities and time of the second and third communication protocols of the present modified example. Communication is performed by using the second communication protocol during a time period between t0 and t1 and a time period after t4, communication is performed by using the third communication protocol during a time period between t2 and t3, switching between the communication protocols is performed during a time period between t1 and t2 and a time period between t3 and t4. As indicated in FIG. 7, during the time period between t0 and t1, the communication remaining quantity of the second communication protocol, which is currently being used, decreases and, on the other hand, the communication remaining quantity of the third communication protocol, which is not currently used, remains constant. Therefore, the difference between the communication remaining quantities of these communication protocols is gradually increased. Then, when the difference reaches or exceeds the difference threshold value at t1, the communication control unit 106 switches the communication protocol of the second communication unit 102 at the switchable position. The same description applies also at t3.

It should be noted that, although when the difference threshold value is set to a small value, communication protocol switching is frequently needed, the communication remaining quantities of the second communication protocol and the third communication protocol can be maintained almost constant. In contrast thereto, if the difference threshold value is set to a large value, a communication protocol switching frequency can be lowered and a processing load and power consumption which are generated by communication protocol switching can be suppressed.

Second Embodiment

In the present embodiment, the first communication unit 101 performs inter-vehicle communication with an in-vehicle communication device mounted in another vehicle by using the first communication protocol. The following description will focus on different points from the first embodiment. Each configuration of the communication device 10 of the present embodiment will be explained in the following with reference to FIG. 1.

The first communication unit 101 is the communication unit which performs inter-vehicle communication by using the first communication protocol.

The second communication unit 102 of the present embodiment receives communication environment information of other vehicles such as current positions of the other vehicles that are traveling around its own vehicle, scheduled positions of the other vehicles, communication performed by communication devices mounted in the other vehicles and so forth by utilizing the communication protocol. The second communication unit 102 receives the communication environment information from other vehicles and the server.

The second communication unit 102 further receives the communication environment information of its own vehicle such as the position information, the scheduled positions, the communication performance (or data communication ability) of the communication device 10 and so forth. That is, the communication device 10 of the present embodiment transmits the communication environment information of its own vehicle which corresponds to the communication environment information of other vehicles that was received by the second communication unit 102 from the other vehicles and the server.

The storage unit 105 of the present embodiment stores therein the communication environment information of other vehicles that was received by the second communication unit 102.

The specifying unit 106 specifies a position, as the switchable position, where communications are available using any one of the first communication protocol, the second communication protocol, and the third communication protocol which are inter-vehicle communications based on the communication environment information stored in the storage unit 105 similarly to the first embodiment.

Figure 8:
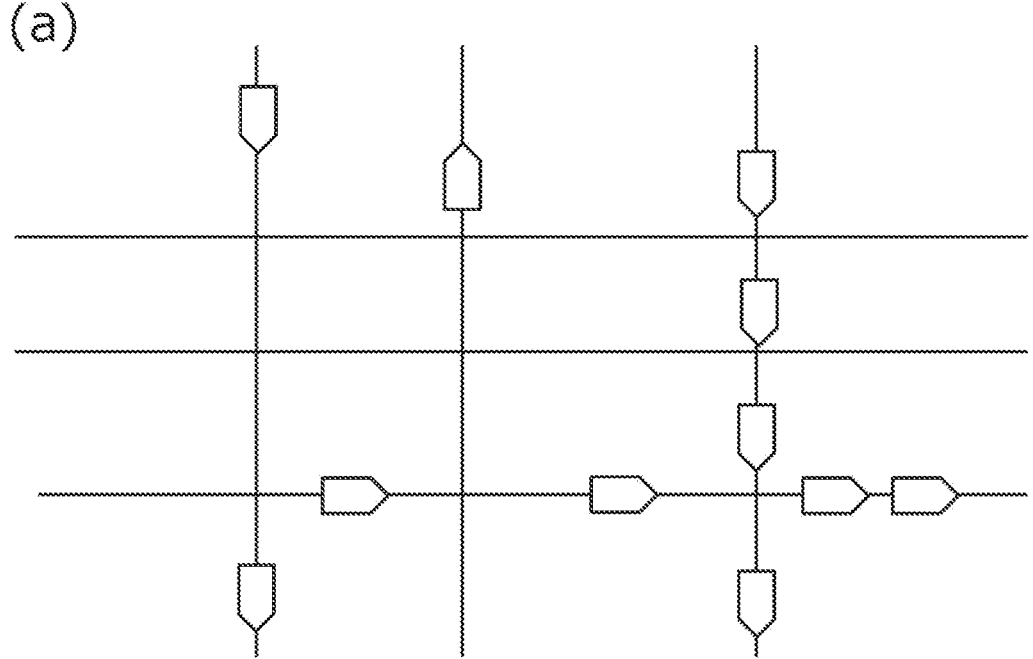
FIG. 8 is a diagram explaining communication environment information that a communication device of a second embodiment receives from a server.
Figure 8:
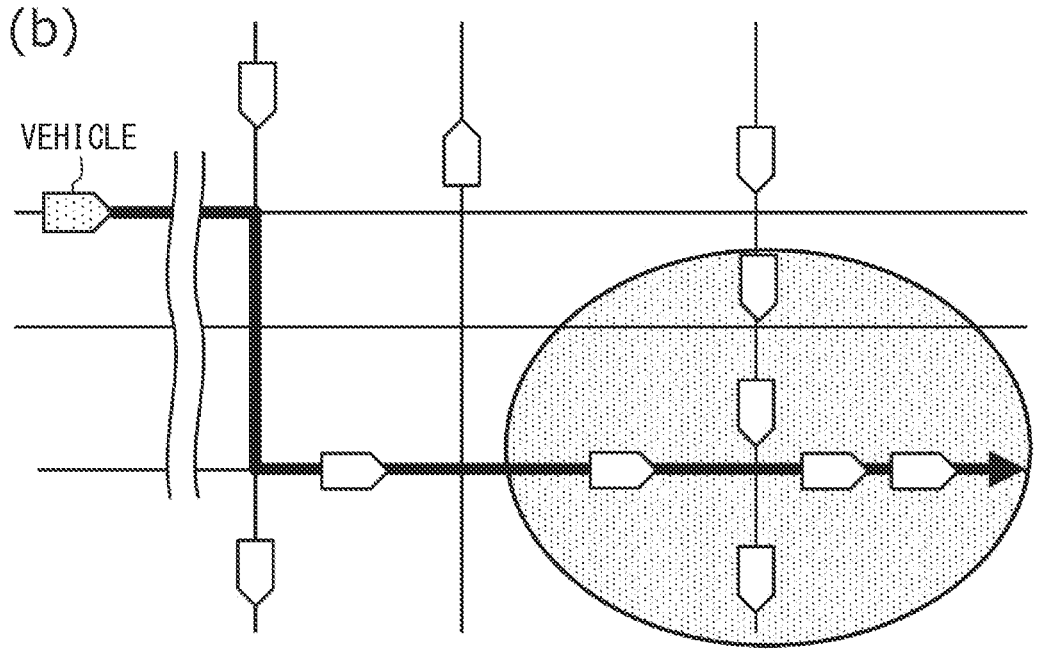

An example of a case where the second communication unit 102 receives the position information of other vehicles as the communication environment information will be explained with reference to FIG. 8. FIG. 8 (a) illustrates a map where the current positions of other vehicles are plotted. The communication device 10 may generate the map illustrated in FIG. 8 (a) based on the received position information of other vehicles and may be also configured such that the server which has collected the position information of each vehicle generates the map and transmits the generated map to the second communication unit 102.

The communication device 10 superimposes the scheduled positions acquired by the scheduled position acquisition unit 103 on the map as illustrated in FIG. 8 (a). FIG. 8 (b) illustrates a state of mutually superimposing the map and the scheduled positions and indicates a route that the vehicle with the communication device 10 plans to travel as indicated by a thick line. According to FIG. 8 (b), it is found that other vehicles are densely concentrated in a circled area. Here, when the area where the other vehicles are densely concentrated is present, the communication device 10 more easily perform inter-vehicle communication with other vehicles in the vicinity of this area. Accordingly, the storage unit 104 stores therein information which indicates that communication can be performed by the first communication protocol in this area. The specifying unit 105 specifies the switchable position based on the information stored.

When the vehicle moves and reaches the inside of the area, the first communication unit 101 starts inter-vehicle communication by the first communication protocol and switches from the second communication protocol which is currently being used to the third communication protocol.

It should be noted that the communication environment information is not limited to the current positions of other vehicles. For example, the communication environment information may be scheduled positions of other vehicles and scheduled times at which other vehicles will reach the scheduled positions. For example, when the communication environment information indicates that the other vehicle will travel through the point X at the time t, the communication device 10 can perform inter-vehicle communication with the in-vehicle communication device of the other vehicle by using the first communication protocol at the time t and the point X. Then, the device 10 stores the latitude/longitude which indicates the point X and the time a communication becomes available in the storage unit 105.

Then, when that vehicle reaches the point X at the time t, the first communication unit 101 starts inter-vehicle communication with the in-vehicle communication device of the other vehicle by using the first communication protocol and switches the communication protocol of the second communication unit 102. As a matter of course, a plurality of pieces of information which relate to the scheduled positions of other vehicles and the times at which the other vehicles will reach the scheduled positions may be present per vehicle.

In the present embodiment, the communication device 10 may transmit information which indicates the communication performance of the other side in-vehicle communication device that performs inter-vehicle communication by using the third communication protocol to the server after communication protocol switching of the second communication unit 102 is completed. In this case, the server can collect the communication performance information of the in-vehicle communication device mounted in each vehicle. As a result, the server transmits only the communication environment information of the vehicle having high communication performance to each in-vehicle communication device. As a result, the inter-vehicle communication during communication protocol switching can be performed between the in-vehicle communication devices having high communication performance.

Third Embodiment

In the above-mentioned embodiments 1, 2, the specifying unit 105 mounted in the vehicle specifies the switchable position based on the communication environment information stored in the storage unit 104. However, the server and so forth may perform processing of specifying the switchable position. In this case, the communication device mounted in the vehicle receives the switchable position and a signal for instructing to perform communication protocol switching from the server and performs communication protocol switching based on the instruction from the server.

Figure 9:
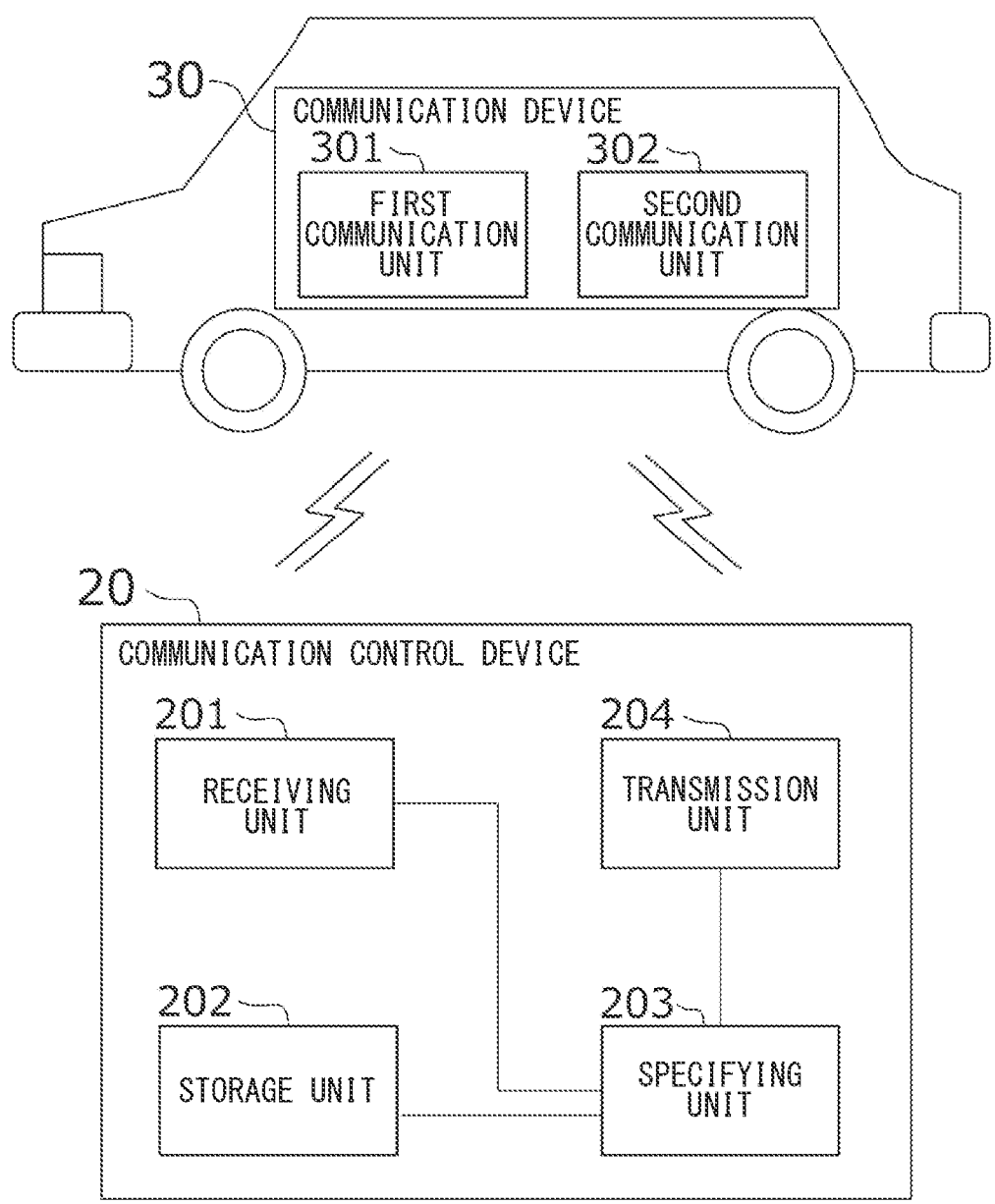
FIG. 9 is a diagram explaining a communication control device and a communication device of a third embodiment.

FIG. 9 illustrates a communication control device 20 of the present embodiment. The communication control device 20 is a device installed in, for example, the server. The communication control device 20 is connected with a communication device mounted in the vehicle over a communication network. It is presupposed that the communication device 30 connected with the communication control device 20 is equipped with a first communication unit 301 which performs communication by using the first communication protocol, a second communication unit 302 which performs communication by using the second communication protocol or the third communication protocol, and a communication control unit (not illustrated) which controls these communication units similarly to the communication device 10.

The communication control device 20 is equipped with a receiving unit 201, a storage unit 202, a specifying unit 203, and a transmission unit 204.

The receiving unit 201 receives the current position of the vehicle from the communication device 30 mounted in the vehicle.

The storage unit 202 stores the scheduled positions of the vehicle and the current position of the vehicle, in addition to the communication environment information which indicates the communication environments of the first, second and third communication protocols that were set in association with the position information, similarly to the function of the storage unit 104 in the above-mentioned embodiments. The scheduled positions of the vehicle may be received from the communication device mounted in the vehicle and may be also received directly from the server (not illustrated) which indicates the scheduled positions to the vehicle. The specifying unit 203 has a function which is the same as that of the specifying unit 105 in the above-mentioned embodiments. In addition, the specifying unit 203 specifies a position where the communication device 30 can communicate using any one of the first communication protocol, the second communication protocol, and the third communication protocol among the scheduled positions of the vehicle as the switchable position based on the communication environment information stored in the storage unit 202.

The transmission unit 204 transmits a signal for instructing to switch the communication protocol of the second communication unit 302 to the communication device 30 at the switchable position specified by the specifying unit 203.

When receiving the signal from the communication control device 20, the communication device 30 executes switching of the communication protocol of the second communication unit 302 at the switchable position.

Incidentally, the first communication unit 301 of the present embodiment may be also the one which performs inter-vehicle communication with the other vehicle by using the first communication protocol similarly to the first communication unit of the second embodiment. In this case, the specifying unit 203 specifies a position where the first communication unit 301 of the communication device 30 can perform inter-vehicle communication by using the first communication protocol as the switchable position based on the positions and the scheduled positions of the plurality of vehicles collected by the receiving unit 201.

According to the present embodiment, since it is possible to select an optimum vehicle from among the vehicles which are switching objects by performing processing of specifying a position where communication protocol switching is performed not on the in-vehicle communication device but on an outer-vehicle device such as the server and so forth, optimization of the communication can be carried out. In addition, it becomes possible to reduce a processing load on the in-vehicle communication device. Further, according to the present embodiment, since the communication environment information can be stored in the outer-vehicle device such as the server and so forth, a load on a memory in the in-vehicle communication device can be reduced. In addition, in a case of updating the communication environment information which is necessary for switching by using wireless communication, update treatment on the vehicle side becomes unnecessary and therefore a wireless communication data volume can be suppressed, and a communication capacity can be suppressed and thereby a communication expense can be reduced.

Other Embodiments

Incidentally, any of the above-mentioned embodiments 1 to 3 is the one that the first and second communication units perform communication with other communication devices by utilizing the wireless communication protocols. However, the first communication unit may be also configured to communicate with the other communication device which is wire-connected to the communication device which is described in each embodiment. In this case, as the other communication device, for example, the smartphone which has been loaded on the vehicle or a personal computer which has been installed in a shop and one's house is conceivable.

In this case, while switching the communication protocol of the second communication unit, the first communication unit performs wired-communication with the other communication device which has been connected to the communication device. However, in a case where the first communication unit performs wired-communication therewith, communication environment information by wiring of the first communication unit is not stored in the storage unit and the specifying unit cannot specify the switchable position. Accordingly, when detecting that the communication device has been wire-connected with the other communication unit, the communication control unit performs an operation of switching the communication protocol of the second communication unit.

(Summarization)

Characteristics of the communication device and the communication control device in the embodiments of the present disclosure have been described as above.

The terms which were used in the embodiments are illustrative ones and therefore may be replaced with synonymous terms or terms which contain synonymous functions.

The block diagram which was used for explanation of the embodiments is the one that the configurations of the communication device and the communication control device have been classified and organized per function. These functional blocks are realized by an optional combination of hardware or software. In addition, since it is the one which has indicated the functions, such a block diagram can be grasped also as the disclosure of the disclosure of the method.

As for functional blocks which can be grasped as the processing, the flow and the method which have been described in each embodiment, the order thereof may be changed as long as there is no such a restriction that they are in a relation that a result of another step is utilized in one step and so forth.

The terms "the first" "the second" which are used in each embodiment and the scope of claims are used for distinctions between/among two or more configurations and methods of the same kind and are not the ones which limit the order and superiority or inferiority.

As examples of the communication device, as a component and a semifinished product, a semiconductor, an electronic circuit, a module or an ECU (Electronic Control Unit) is given. In addition, as finished products, a DCM (Data Communication Module) and a TCU (Telematics Control Unit) are given.

In addition, the communication device and the communication control device which are described in each embodiment can be realized not only in exclusive hardware which has the configurations and the functions which have been explained in each embodiment but also as a combination of a program which has been recorded in a recording medium such as a memory, a hard disc and so forth and is adapted to realize the present disclosure with general-purpose hardware which has an exclusive or general-purpose CPU (i.e., a processor) which can execute it and the memory and so forth.

The program which is stored into exclusive and general-purpose hardware recording media (external storage devices (a hard disc drive, a solid-state drive, a USB memory, an SD memory card, a CD/BD, a non-transitory tangible storage medium and so forth), and internal storage devices (a RAM, a ROM and so forth)) can be also provided to the exclusive or general-purpose hardware via the recording medium, or from the server over the communication line with no intervention of the recording medium. Thereby, latest functions can be always provided through upgrading of the program.

Although the communication device of the present disclosure has been explained by keeping the communication device which is to be loaded on the automobile in each embodiment in mind, it is possible to apply it to the mobile bodies in general which move such as the motorcycles, the bicycles, the pedestrians, the murine vessels, railroads, the aircrafts and so forth, in addition, they may be unmanned mobile bodies not limited to the manned ones and it includes them. In addition, it is sufficient that the communication device be a communication device which is to be loaded on an optional moving body and it is possible to apply it to the cell phones, the smartphones, the tablet-type personal computer (the tablet PCs), the portable-type personal computers, the wearable terminals with the communication function being loaded thereon.

The invention claimed is:

1. A communication device mounted in a moving body, the device comprising a processor and memory configured to implement:
   a first communication unit that is configured to perform communication using a first communication protocol;
   a second communication unit that is configured to perform communication selectively using a second communication protocol and a third communication protocol;
   a scheduled position acquisition unit that is configured to acquire a plurality of scheduled positions through which the moving body is to pass;
   a storage unit that is configured to store communication environment information, the communication environment information indicating a communication environment of each of the first to third communication protocols and being set in association with position information;
   a specifying unit that is configured to specify, based on the communication environment information, a position among the plurality of scheduled positions as a switchable position where communications are available using any one of the first communication protocol, the second communication protocol, and the third communication protocol; and
   a switching unit that is configured to switch, at the switchable position, a communication protocol of the second communication unit from the second communication protocol, which is currently being used, to the third communication protocol, wherein
   the first communication unit is further configured to perform communication using the first communication protocol while the switching unit is switching the communication protocol of the second communication unit, and
   the second communication unit is further configured to start communication using the third communication protocol when the switching unit completes switching the communication protocol of the second communication unit.

2. The communication device according to claim 1, wherein
the communication environment information is information indicative of communication quality, and
the specifying unit is further configured to:
specify a first reference position among the plurality of scheduled positions where the communication quality of the second communication protocol is equal to or less than a predetermined quality threshold value; and
specify a position through which the moving body is to pass before the first reference position as the switchable position.

3. The communication device according to claim 1, wherein
the communication environment information is information indicative of communication quality, and
the specifying unit is further configured to:
specify a second reference position where the communication quality of the second communication protocol is equal to or less than the communication quality of the third communication protocol; and
specify a position that is closest to the second reference position as the switchable position.

4. The communication device according to claim 1, wherein
the communication environment information is information indicative of a communication speed, and
the switching unit is further configured to:
calculate, based on the communication speed, a first transmission time required to transmit data using the second communication protocol and a second transmission time required to transmit the data using the third communication protocol; and
switch the communication protocol of the second communication unit when the first transmission time is equal to or more than a predetermined time threshold value and the second transmission time is equal to or less than the predetermined time threshold value.

5. The communication device according to claim 1, wherein
the storage unit is further configured to store a first communication remaining quantity that is a remaining quantity of a contracted communication quantity of the second communication protocol and a second communication remaining quantity that is a remaining quantity of a contracted communication quantity of the third communication protocol, and
the switching unit is configured to change the communication protocol of the second communication unit when a difference between the first communication remaining quantity and the second communication remaining quantity is equal to or greater than a predetermined difference threshold value.

6. The communication device according to claim 1, wherein
the second communication unit is configured to receive the communication environment information using the second communication protocol, and
the storage unit is configured to store the communication environment information received by the second communication unit.

7. The communication device according to claim 1, wherein the first communication unit is configured to communicate with a communication device that is mounted in another moving body.

8. The communication device according to claim 1, wherein
the second communication unit has a first SIM and a second SIM, and
the second communication protocol is correlated with the first SIM and the third communication protocol is correlated with the second SIM.

9. The communication protocol according to claim 1, wherein
the second communication unit has an eSIM (embedded SIM) in which profile information used for communication is rewritable, and
the second communication protocol is correlated with first profile information included in the profile information and the third communication protocol is correlated with second profile information included in the profile information.

10. A communication method executed by a communication device mounted in a moving body, the communication device including a first communication unit that is configured to perform communication using a first communication protocol and a second communication unit that is configured to perform communication selectively using a second communication protocol and a third communication protocol, the method comprising:
acquiring a plurality of scheduled positions through which the moving body is to pass;
specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information;
switching, at the switchable position, a communication protocol of the second communication unit from the second communication protocol, which is currently being used, to the third communication protocol;
performing, with the first communication unit, communication using the first communication protocol while the communication protocol of the second communication unit is being switched; and
starting, with the second communication unit, communication using the third communication protocol upon completing switching the communication protocol of the second communication unit.

11. A non-transitory computer readable medium storing a communication program for a communication device mounted in a moving body, the communication device including a first communication unit that is configured to perform communication using a first communication protocol and a second communication unit that is configured to perform communication selectively using a second communication protocol and a third communication protocol, the communication program comprising instructions configured to, when executed, cause a processor to:
acquire a plurality of scheduled positions through which the moving body is to pass;
specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information;

switch, at the switchable position, a communication protocol of the second communication unit from the second communication protocol, which is currently being used, to the third communication protocol;

perform, with the first communication unit, communication using the first communication protocol while the communication protocol of the second communication unit is being switched; and start, with the second communication unit, communication using the third communication protocol upon completing switching the communication protocol of the second communication unit.

12. A communication control device that is configured to communicate with a communication device mounted in a moving body and having a processor and memory configured to implement a first communication unit that is configured to perform communication using a first communication protocol and a second communication unit that is configured to perform communication selectively using a second communication protocol and a third communication protocol, the first communication unit being configured to perform communication using the first communication protocol during switching of a communication protocol of the second communication unit, the second communication unit being configured to start communication using the third communication protocol upon completing switching the communication protocol of the second communication unit, the processor and memory being further configured to implement:

a receiving unit that is configured to receive a plurality of scheduled positions through which the moving body is to pass from the communication device;

a storage unit that is configured to store communication environment information, the communication environment information indicating a communication environment of each of the first to third communication protocols and being set in association with position information;

a specifying unit that is configured to specify a position among the plurality of scheduled positions as a switchable position where communications are available using any one of the first communication protocol, the second communication protocol, and the third communication protocol based on the communication environment information; and a transmission unit that is configured to transmit, to the communication device, a signal for instructing the second communication unit to switch its communication protocol from the second communication protocol, which is currently being used, to the third communication protocol at the switchable position.

13. A communication control method executed by a communication control device that is configured to communicate with a communication device mounted in a moving body, the communication device including a first communication unit that is configured to perform communication using a first communication protocol and a second communication unit that is configured to perform communication selectively using a second communication protocol and a third communication protocol, the first communication unit being configured to perform communication using the first communication protocol while a communication protocol of the second communication unit is being switched, the second communication unit being configured to start communication using the third communication protocol upon completing switching the communication protocol of the second communication unit, the communication control method comprising:

receiving a plurality of scheduled positions through which the moving body is to pass from the communication device;

specifying a position among the plurality of scheduled positions as a switchable position where communications are available using any one of the first communication protocol, the second communication protocol, and the third communication protocol based on communication environment information, the communication environment information indicating a communication environment of each of the first to third communication protocols and being set in association with position information;

transmitting, to the communication device, a signal for instructing the second communication unit to switch its communication protocol from the second communication protocol, which is currently being used, to the third communication protocol at the switchable position.

* * * * *